(12) United States Patent
Liu et al.

(10) Patent No.: US 10,295,834 B2
(45) Date of Patent: May 21, 2019

(54) DISPLAY APPARATUS WITH A MULTI-LEVEL DISPLAY COMPRISING A DISPLAY PANEL HAVING A PLURALITY OF DISPLAY DEVICES THAT CORRESPOND WITH A PLURALITY OF MICROLENS DEVICES

(71) Applicant: SHANGHAI TIANMA MICRO-ELECTRONICS CO., LTD., Shanghai (CN)

(72) Inventors: Yaoyang Liu, Shanghai (CN); Lei Niu, Shanghai (CN); Jian Xu, Shanghai (CN); Jialing Li, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 15/888,064

(22) Filed: Feb. 4, 2018

(65) Prior Publication Data

US 2018/0157056 A1 Jun. 7, 2018

(30) Foreign Application Priority Data

Oct. 20, 2017 (CN) .......................... 2017 1 0998759

(51) Int. Cl.
| | |
|---|---|
| *G02B 3/00* | (2006.01) |
| *G02F 1/29* | (2006.01) |
| *G02B 26/00* | (2006.01) |
| *G02B 26/06* | (2006.01) |
| *G02B 27/22* | (2018.01) |
| *G02F 1/1335* | (2006.01) |

(Continued)

(52) U.S. Cl.
CPC ....... *G02B 27/2214* (2013.01); *G02B 3/0006* (2013.01); *G02B 26/005* (2013.01); *G02B 26/06* (2013.01); *G02B 27/2278* (2013.01); *G02F 1/133526* (2013.01); *G02F 2001/294* (2013.01); *G02F 2201/122* (2013.01)

(58) Field of Classification Search
CPC .. G02B 27/2278; G02B 3/0006; G02B 26/06; G02F 1/137; G02F 2203/50
USPC .............................................. 349/48, 41–43
See application file for complete search history.

(56) References Cited

U.S. PATENT DOCUMENTS 8,854,724 B2 * 10/2014 El-Ghoroury ........ G02B 26/101
359/298
2012/0307357 A1 12/2012 Choi
(Continued)

FOREIGN PATENT DOCUMENTS

CN 105629469 A 6/2016

*Primary Examiner* — Paul C Lee
(74) *Attorney, Agent, or Firm* — Kilpatrick Townsend & Stockton, LLP

(57) ABSTRACT

Disclosed is a display apparatus includes a display panel which includes display devices; a micro lens group located above a light-emitting side of the display panel, and the micro lens group includes micro lens devices, and the micro lens devices are disposed to correspond to the display devices, respectively, and distances between centers of the micro lens devices and centers of the corresponding display devices are gradually increased along a direction from a center position to an edge position of the display panel. Further, a liquid lens disposed on a side of the micro lens group away from the display panel, and the liquid lens is configured for realizing multi-layer display of a suspension image by changing a phase of incident light.

17 Claims, 16 Drawing Sheets

(51) Int. Cl.
*G02F 1/1343* (2006.01)
*G02F 1/1368* (2006.01)

(56) References Cited

U.S. PATENT DOCUMENTS

| | | | | |
|---|---|---|---|---|
| 2013/0258451 | A1* | 10/2013 | El-Ghoroury | G02B 26/101 359/298 |
| 2014/0063611 | A1* | 3/2014 | Raymond | B42D 15/00 359/619 |
| 2015/0002940 | A1* | 1/2015 | Nister | G02B 27/0172 359/630 |
| 2015/0015768 | A1* | 1/2015 | Tanaka | H01L 27/14621 348/342 |
| 2015/0145088 | A1* | 5/2015 | Kim | H01L 27/14645 257/432 |
| 2015/0187844 | A1* | 7/2015 | Lee | H04N 5/378 250/208.1 |
| 2015/0264335 | A1* | 9/2015 | Park | G02B 3/0006 348/49 |

\* cited by examiner

DISPLAY APPARATUS WITH A MULTI-LEVEL DISPLAY COMPRISING A DISPLAY PANEL HAVING A PLURALITY OF DISPLAY DEVICES THAT CORRESPOND WITH A PLURALITY OF MICROLENS DEVICES

CROSS-REFERENCE TO RELATED APPLICATIONS

This application claims priority to Chinese patent application No. 201710998759.7 filed on Oct. 20, 2017, the disclosure of which is incorporated herein by reference in its entirety.

TECHNICAL FIELD

Embodiments of the present invention relates to a suspension display technology, and more particularly, to a display apparatus.

BACKGROUND

With development of sciences and technologies and improvement of people's living standards, requirements for display apparatuses are not only limited to simply transmitting two-dimensional planar information, instead, the display apparatuses are expected to provide three-dimensional image information that is more realistic and stereoscopic, and can achieve more physical and psychological depth clues.

At present, common three-dimensional display apparatuses generally adopt a parallax-type three-dimensional display principle in which left and right views are separated by a cylindrical lens array or a grating array so as to enter left and right eyes of an observer, respectively, thereby producing stereoscopic perception by binocular parallax. However, because such manner can only reflect parallax information, and aggregation and convergence information is difficult to match, the user would experience fatigue, dizziness, nausea and vomiting when viewing above parallax-type naked eye three-dimensional display images for a long time. In addition, the three-dimensional display image presented in this manner does not change as the observer moves his eyes, so that a range of a viewing angle is small and it is difficult to be accepted in the market.

A suspension display technology belongs to a type of integrated imaging, and is a true three-dimensional autostereoscopic display technology based on micro lens array. This technology can achieve the suspension display of an image, increase the viewing angle of the three-dimensional display, and is comfortable to observe without a fatigue, thereby enhancing use experience of the observer. However, in the prior art, for a suspension display apparatus with a definite structure, height of the displayed suspension image is constant, and hence multi-layer displays for the suspension image may not be realized, which in fact limits an application of the suspension display to a certain extent.

SUMMARY

The present disclosure provides a display apparatus to achieve multi-level display for a suspension image of the display apparatus.

An embodiment of the present invention provides a display apparatus, where the display apparatus includes: A display panel including a plurality of display devices; A micro lens group located above a light-emitting side of the display panel. The micro lens group includes a plurality of micro lens devices, and the micro lens devices are disposed to correspond to the display devices, respectively. A distance between a center of the micro lens device closer to a center of the display panel and a center of the corresponding display device is less than a distance between a center of the micro lens device farther from the center of the display panel and a center of the corresponding display device. A liquid lens disposed on a side of the micro lens group away from the display panel. The liquid lens is configured for realizing multi-layer display of a suspension image by changing a phase of incident light.

A display apparatus provided in an embodiment of the present invention includes a display panel, a micro lens group, and a liquid lens. The display panel includes a plurality of display devices. The micro lens group is located above a light-emitting side of the display panel. The micro lens group includes a plurality of micro lens devices, and the micro lens devices are disposed to correspond to the display devices, respectively. A distance between a center of the micro lens device closer to a center of the display panel and a center of the corresponding display device is less than a distance between a center of the micro lens device farther from the center of the display panel and a center of the corresponding display device. The liquid lens is disposed on a side of the micro lens group away from the display panel. The liquid lens is configured for realizing multi-layer display for a suspension image by changing a phase of incident light, so as to enable a distance between the suspension image presented by the display device and the display panel to be variable, thereby realizing multi-layer suspension display for the display apparatus and further achieving a three-dimensional dynamic visual effect.

DETAILED DESCRIPTION

A display apparatus provided in an embodiment of the present invention includes a display panel, a micro lens group and a liquid lens.

The display panel includes a plurality of display devices.

The micro lens group is located above a light-emitting side of the display panel, and includes a plurality of micro lens devices. The micro lens devices are disposed to correspond to the display devices, respectively. A distance between a center of the micro lens device closer to a center of the display panel and a center of the corresponding display device is less than a distance between a center of the micro lens device farther from the center of the display panel and a center of the corresponding display device.

The liquid lens is disposed on a side of the micro lens group away from the display panel, and is configured for realizing multi-layer display for a suspension image by changing a phase of incident light.

A display apparatus provided in an embodiment of the present invention includes a display panel, a micro lens group, and a liquid lens. The display panel includes a plurality of display devices. The micro lens group is located above a light-emitting side of the display panel, and includes a plurality of micro lens devices. The micro lens devices are disposed to correspond to the display devices, respectively. A distance between a center of the micro lens device closer to a center of the display panel and a center of the corresponding display device is less than a distance between a center of the micro lens device farther from the center of the display panel and a center of the corresponding display device. The liquid lens is disposed on a side of the micro lens group away from the display panel, and is configured for realizing multi-layer display for a suspension image by changing a phase of incident light, so as to make a distance between the suspension image presented by the display device and the display panel variable, thereby realizing multi-layer suspension display of the display apparatus and further achieving a three-dimensional dynamic visual effect.

Numerous specific details are set forth in the following description in order to provide a thorough understanding of the present disclosure, but the present disclosure may be implemented in other different forms than those described herein.

Next, the present disclosure will be described in detail with reference to the accompanying drawings. In describing the embodiments of the present invention in detail, for the convenience of description, schematic diagrams showing the structure of the device is not partially enlarged according to a common scale, and the schematic diagram is merely an example and should not limit the scope of the present disclosure herein. In addition, length, width and height of a three-dimensional space size should be included in actual production.

Figure 1:
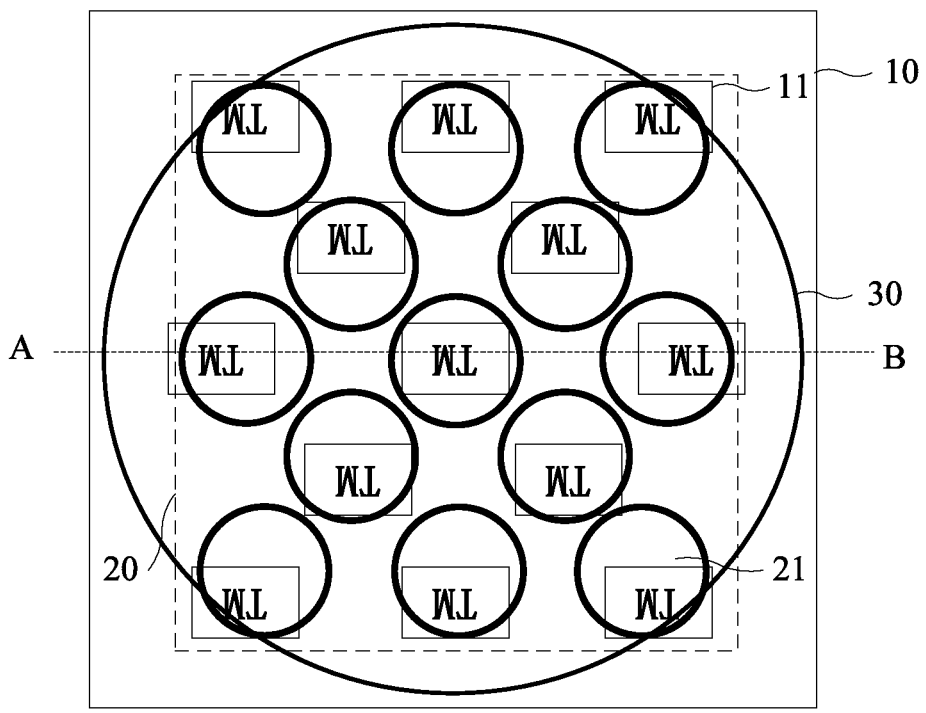
FIG. 1 is a structural representation of a display apparatus according to an embodiment of the present invention.
Figure 2:
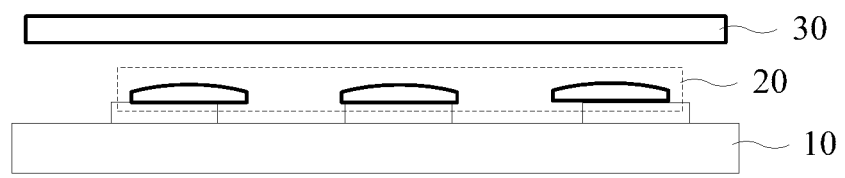
FIG. 2 is a schematic sectional view taken along a dashed line AB in FIG. 1.

FIG. 1 is a structural representation of a display apparatus according to an embodiment of the present invention. FIG. 2 is a schematic sectional view taken along a dashed line AB in FIG. 1. As shown in FIG. 1 and FIG. 2, the display apparatus includes a display panel 10, a micro lens group 20 and a liquid lens 30. The display panel 10 includes a plurality of display devices 11. The micro lens group 20 includes a plurality of micro lens devices 21, and the micro lens devices 21 are disposed to correspond to the display devices 11, respectively (that is, the micro lens devices 21 correspond to the display devices 11 in a one-to-one relationship). Distances between centers of the micro lens devices 21 and centers of the corresponding display devices 11 are gradually increased along a direction from a center position to an edge position of the display panel. That is, a distance between a center of the micro lens device 21 closer to the center of the display panel and a center of the corresponding display device 11 is less than a distance between a center of the micro lens device 21 farther from the center of the display panel and a center of the corresponding display device 11. As shown in FIG. 2, the micro lens group 20 is located above a light-emitting side of the display panel 10. The liquid lens 30 is disposed on a side of the micro lens group 20 away from the display panel 10, and is configured for performing multi-layer display for a suspension image by changing a phase of incident light.

In FIG. 1, an orthographic projection of the liquid lens 30 on the display panel 10 is circular. It can be understood that, in other implementations of this embodiment, this cross section may be other shapes, and can set by the operator reasonably as needed, which is not specifically limited in this embodiment.

It should be noted that, without considering the liquid lens 30, each of the micro lens devices 21 in the micro lens group 20 corresponds to one of the display devices 11 of the display panel 10. In an embodiment, display images of the plurality of display devices 11 are the same. The positions of the micro lens devices 21 and the corresponding display devices 11, that is, the distances between the centers of the micro lens devices 21 and the centers of the corresponding display devices 11 are configured to be gradually increased from the center position to the edge position of the display panel 10. In such an arrangement, the micro lens devices 21 each can be made to display images with different viewing angles, thereby achieving an effect of suspension display, and increasing the viewing angles significantly.

It should be further noted that, in the case that the liquid lens 30 is not provided, light emitted from the display device 11 is emitted through the micro lens group 20 to form a suspension image at a set height. For easy distinction, the suspension image may be denoted as an original suspension image. In this embodiment, the liquid lens 30 is disposed on a side of the micro lens group 20 away from the display panel 10. The light emitted from the display device 11 passes through the micro lens group 20 and is then emitted via the liquid lens 30 to form a new suspension image, which is denoted as a new suspension image. The new suspension image can be regarded as secondary imaging based on the liquid lens 30 from the original suspension image as an object. In this case, the liquid lens 30 is similar to a lens. According to a lens imaging principle, it can be known that for an original suspension image with a fixed suspension height, new suspension images with different suspension heights can be obtained by changing a focal length of the lens, thereby realizing the multi-layer display for the suspension image. When the focal length of the lens changes rapidly, three-dimensional dynamic display can be realized on the visual effect. It should be noted that different types of liquid lenses change their focal lengths differently. Exemplarily, as a typical liquid lens, the liquid crystal light modulator changes phase retardation of the incident light by adjusting a rotation angle of liquid crystal molecule, so that a wavefront (a curved surface consisting of equiphase surfaces of a certain position where the wave propagates to) of incident light changes after it passes through the liquid crystal light modulator. Since a propagation direction of the light is perpendicular to the equiphase surface, the propagation direction of the light also changes. When the amount of change in the propagation direction of the light at each position is similar to the amount of change in the corresponding propagation direction of the light under action of lens, the liquid crystal light modulator may function as a lens. In addition, different rotation angles of the liquid crystal molecules enable different wavefronts of the incident light after the light passes through the liquid crystal light modulator. Since the incident light have different wavefronts after the light passes through different lenses having different focal lengths, it can be seen that when the liquid crystal light modulator is similar to a lens, its focal length can be changed by adjusting the rotation angle of the liquid crystal molecules. It can be understood that, in different display devices, the positional relationship between the display device 11 and the micro lens device 21 can be adjusted. By adjusting the positional relationship between the display device 11 and the micro lens device 21, original suspension images with different heights and different types, such as an virtual original suspension image formed at a side of the display panel 10 away from the micro lens group 20 or a real suspension image formed at a side of the display panel 10 close to the micro lens group 20, can be obtained.

The display apparatus provided in this embodiment includes a display panel 10, a micro lens group 20 and a liquid lens 30. The display panel 10 includes a plurality of display devices 11, the micro lens group 20 is located above the light-emitting side of the display panel 10. The micro lens group 20 includes a plurality of micro lens devices 21, and the micro lens devices 21 are disposed to correspond to the display devices 11, respectively. The distances between centers of the micro lens devices 21 and centers of the corresponding display devices 11 are gradually increased along a direction from a center position to an edge position of the display panel 10. The liquid lens 30 is disposed on a side of the micro lens group 20 away from the display panel 10, and is configured for realizing multi-layer display for the suspension image by changing a phase of the incident light, such that a distance between the suspension image presented by the display device and the display panel 10 is variable, thereby realizing the multi-layer suspension display for the display apparatus, and achieving the stereoscopic dynamic visual effect.

In this embodiment, the display panel 10 may be any of a liquid crystal display panel, a cathode ray tube display panel, and an organic light-emitting display panel.

Exemplarily, a refresh frequency of a driving signal for the plurality of display devices 11 may be the same as a refresh frequency of a driving voltage for the liquid lens 30. It can be understood that each time the driving signal for the display device 11 is refreshed, the content of the corresponding suspension image can be changed once. When the driving voltage for the liquid lens 30 is refreshed once, the focal length of the lens approximated by the liquid lens 30 can be changed once and the height of the correspondingly obtained suspension image can be changed once. Since the refresh frequency of the driving signal for the display device 11 is set to be the same as the refresh frequency of the driving voltage for the liquid crystal lens, each of the suspension images displayed by the display apparatus is enabled to be formed at a same suspension height, and when the content of the suspension images is different from each other, a continuous three-dimensional dynamic picture can be obtained.

In an embodiment, the refresh frequency of the driving voltage for the liquid lens 30 may be greater than or equal to 60 Hz. 60 Hz is a common refresh frequency of the driving signal of the display device 11. The refresh frequency of the driving voltage for the liquid lens 30 is set to be greater than or equal to 60 Hz, so that the variation speed of the suspension height of the suspension image can be increased, and hence it is difficult for human eyes to recognize the adjacent suspension images, thereby enhancing the visual effects of three-dimensional dynamic picture. In an embodiment, the refresh frequency of the driving voltage for the liquid lens 30 is an integral multiple of the refresh frequency of the driving signal for the display device 11.

Figure 3:
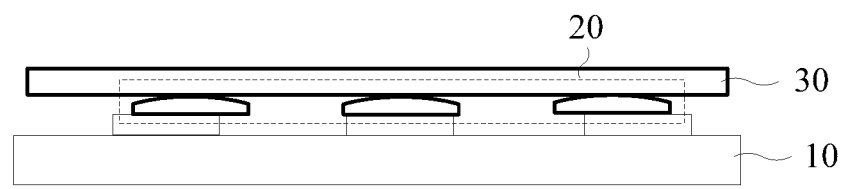
FIG. 3 is another schematic sectional view taken along the dashed line AB in FIG. 1.

FIG. 3 is another schematic sectional view taken along the dashed line AB in FIG. 1. As shown in FIG. 3, the liquid lens 30 may be in contact with the micro lens group 20. Such an arrangement can minimize the thickness of the display apparatus and contribute to the thinning of the display apparatus.

In an embodiment, the liquid lens 30 may be a liquid crystal light modulator, an electrowetting zoom lens, or a piezoelectric zoom lens.

Figure 4:
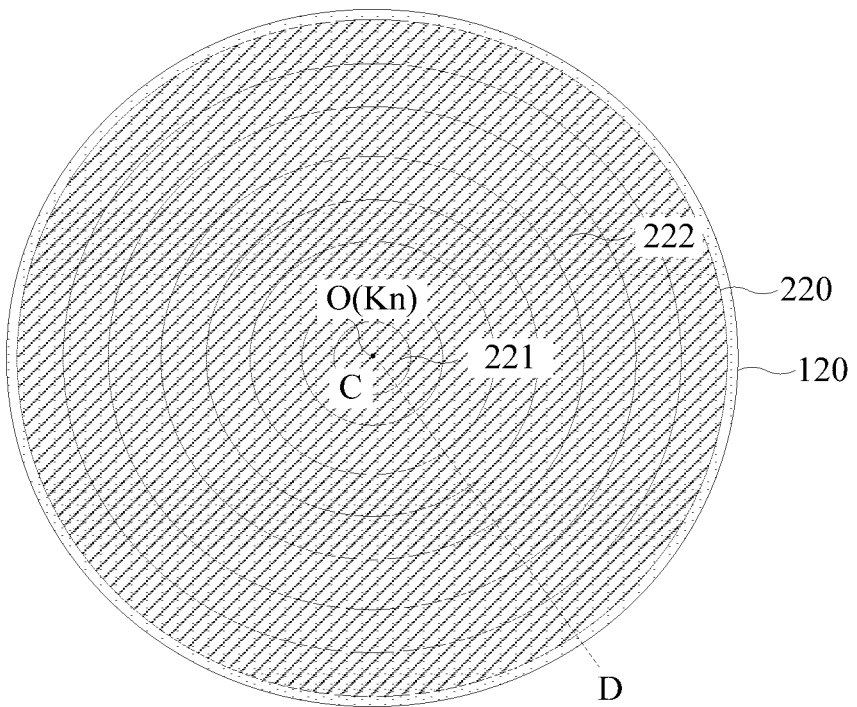
FIG. 4 is a structural representation of a liquid crystal light modulator according to an embodiment of the present invention.
Figure 5:
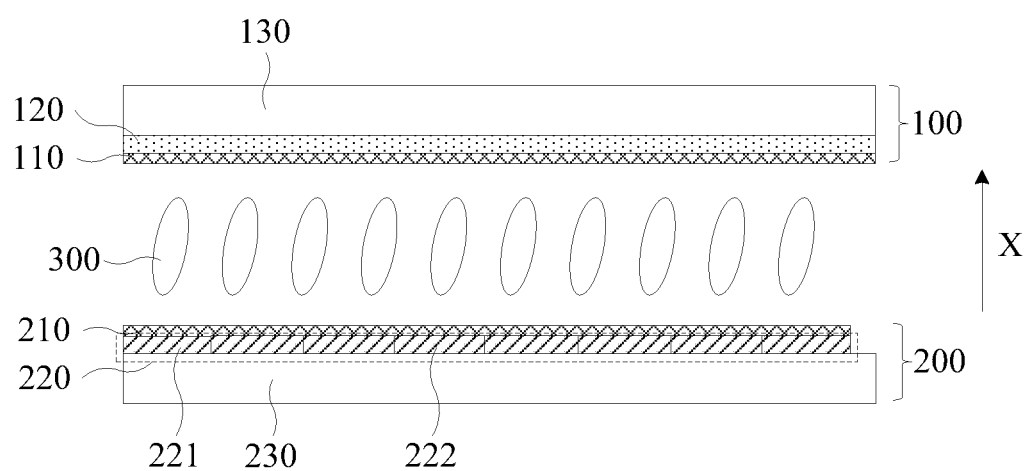
FIG. 5 is a schematic sectional view taken along a dashed line CD in FIG. 4.

FIG. 4 is a structural representation of a liquid crystal light modulator according to an embodiment of the present invention. FIG. 5 is a schematic sectional view taken along a dashed line CD in FIG. 4. As shown in FIG. 5, the liquid crystal light modulator includes a first baseplate 100 and a second baseplate 200 disposed opposite to each other, and a liquid crystal layer 300 disposed between the first baseplate 100 and the second baseplate 200. The first baseplate 100 includes a first substrate 130, a first electrode layer 120 and a first alignment layer 110 which are sequentially stacked, and the second baseplate 200 includes a second substrate 230, a second electrode layer 220 and a second alignment layer 210 which are sequentially stacked. The first alignment layer 110 and the second alignment layer 210 are located at two sides of the liquid crystal layer 300, respectively.

As shown in FIG. 4, the first electrode layer 120 is a whole layer structure, and the second electrode layer 220 includes a circular electrode 221 and a plurality of ring electrodes 222. Referring to FIGS. 4 and 5, if a stacking direction from the second baseplate 200 to the first baseplate 100 is defined as a first direction X, a circle center of a cross section of the circular electrode 221 perpendicular to the first direction X is O, and a geometric center of a cross section of the plurality of ring electrodes 222 perpendicular to the first direction X is Kn, then O coincides with Kn. Along an extending direction of a diameter of the circular electrode 221, the plurality of ring electrodes 222 are successively disposed outside the circular electrode 221, and adjacent electrodes in the second electrode layer 220 are insulated from each other.

It should be noted that each of the ring electrodes 222 in the above structure can be individually controlled, so that the liquid crystal molecules between the ring electrodes 222 and the first electrode layer 120 can be applied with different voltages, and so as to have different angles of rotation under an action of the corresponding voltages, thereby achieving different phase delays of incident light. Then, the liquid crystal light modulator is similar to a circular lens. It is noted that, because the cell thickness of the liquid crystal light modulator is fixed, the liquid crystal light modulator is more similar to a Fresnel lens, rather than a traditional spherical lens that is thicker in the middle and thinner at the around.

Figure 6:
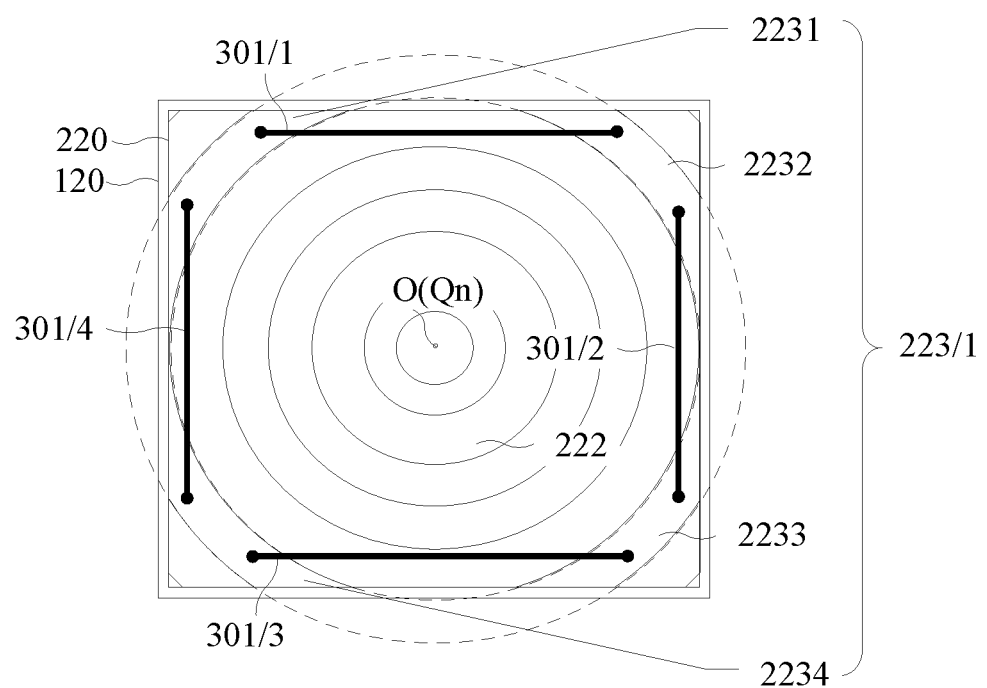
FIG. 6 is a structural representation of another liquid crystal light modulator according to an embodiment of the present invention.

FIG. 6 is a structural representation of another liquid crystal light modulator according to an embodiment of the present invention. The structure of the liquid crystal light modulator shown in FIG. 6 is similar to that of the liquid crystal light modulator shown in FIG. 4, except that the second electrode layer 220 in FIG. 6 further includes at least one connection electrode 223, the connection electrode 223 includes a plurality of sub-connection electrodes, and adjacent two of the plurality of sub-connection electrodes are electrically connected to each other via a conductive wire 301. The plurality of sub-connection electrodes are located on the same ring, and a geometric center Qn of the ring coincides with the circle center O of the cross section of the circular electrode 221 perpendicular to the first direction. In an embodiment, the at least one connection electrode 223 includes a plurality of connection electrodes 223, and along the extending direction of the diameter of the circular electrode 221, the plurality of connection electrodes 223 are successively disposed outside the plurality of ring electrodes 222.

Exemplarily, as shown in FIG. 6, the second electrode layer 220 includes a first connection electrode 223/1, and the first connection electrode 223/1 includes a first sub-connection electrode 2231, a second sub-connection electrode 2232, a third sub-connection electrode 2233 and a fourth sub-connection electrode 2234. The first sub-connection electrode 2231, the second sub-connection electrode 2232, the third sub-connection electrode 2233 and the fourth sub-connection electrode 2234 are all located on the ring shown as the dashed line in the FIG. 6, The sub-connection electrode 2231 is electrically connected to the second sub-connection electrode 2232 via a first conductive wire 301/1, the second sub-connection electrode 2232 is electrically connected to the third sub-connection electrode 2233 via a second conductive wire 301/2, and the third sub-connection electrode 2233 is electrically connected to the fourth sub-connection electrode 2234 via a third conductive wire 301/3, and the fourth sub-connection electrode 2234 is electrically connected to the first sub-connection electrode 2231 via a fourth conductive wire 301/4.

It should also be noted that the liquid crystal light modulator shown in FIG. 6 can be regarded as a part of a rectangular region of the liquid crystal light modulator shown in FIG. 4, and working principles of both are similar, but can be applied to display panels having different structures, respectively, due to different shapes thereof.

In an embodiment, the number of the ring electrodes 222 may be greater than or equal to 9. It should be noted that the more the number of the ring electrodes 222 is, the smaller the width of each of the ring electrodes 222 in the liquid crystal light modulator with the same size will be, and the higher the modulation precision of the liquid crystal light modulator will be. In order to obtain a high accuracy of the liquid crystal light modulator, it may set the number of the ring electrodes 222 greater than or equal to 9.

Figure 7:
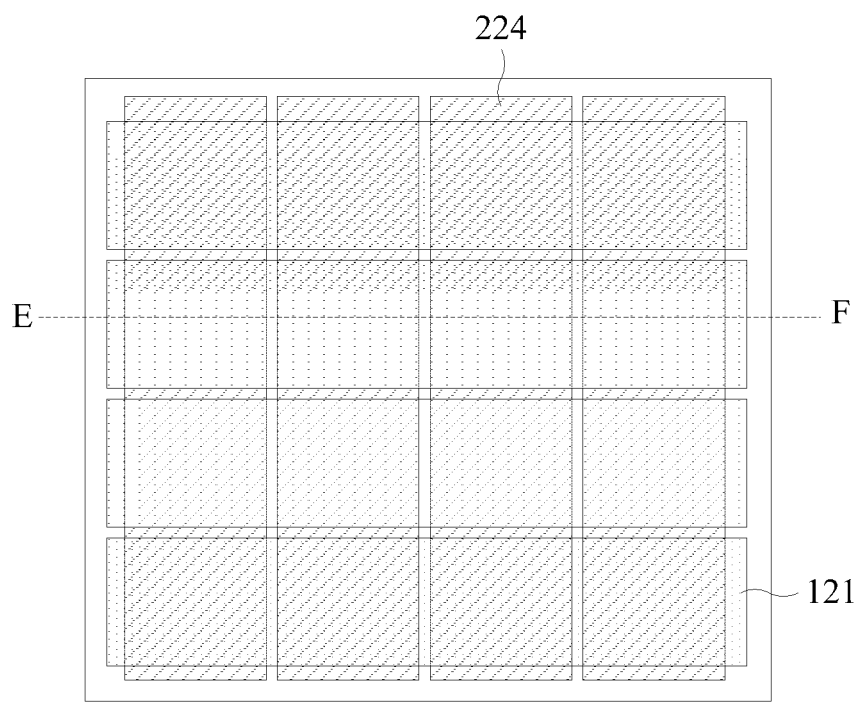
FIG. 7 is a structural representation of yet another liquid crystal light modulator according to an embodiment of the present invention.
Figure 8:
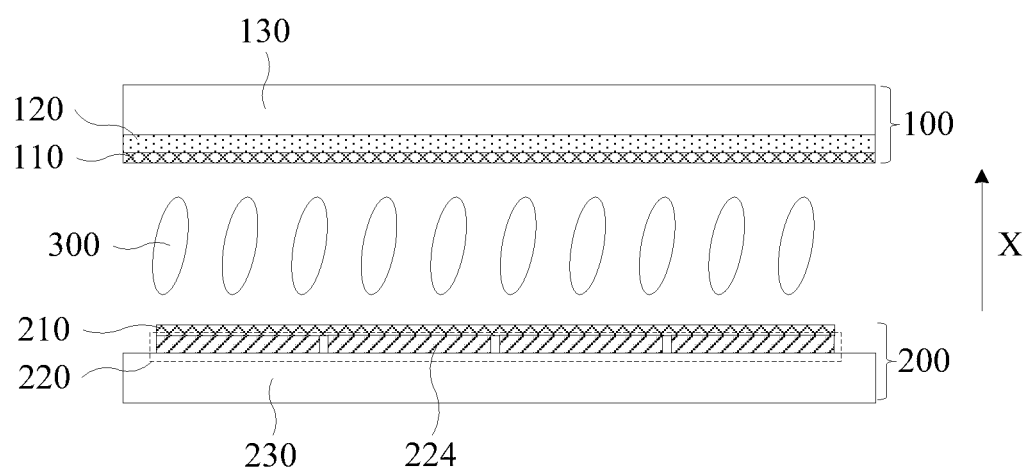
FIG. 8 is a schematic sectional view taken along the dashed line EF in FIG. 7.
Figure 9:
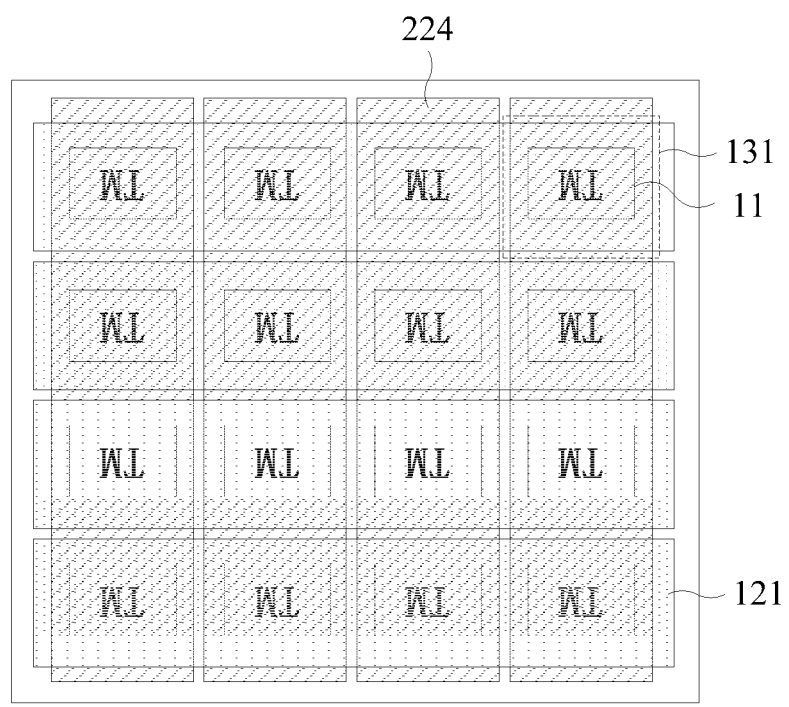
FIG. 9 is a structural representation of a display apparatus including the liquid crystal light modulator shown in FIG. 8.

FIG. 7 is a structural representation of yet another liquid crystal light modulator according to an embodiment of the present invention. FIG. 8 is a schematic sectional view taken along the dashed line EF in FIG. 7. As shown in FIG. 8, the liquid crystal light modulator includes a first baseplate 100 and a second baseplate 200 disposed opposite to each other, and a liquid crystal layer 300 disposed between the first baseplate 100 and the second baseplate 200. The first baseplate 100 includes a first substrate 130, a first electrode layer 120 and a first alignment layer 110 which are sequentially stacked, and the second baseplate 200 includes a second substrate 230, a second electrode layer 220 and a second alignment layer 210 which are sequentially stacked. The first alignment layer 110 and the second alignment layer 210 are located at two sides of the liquid crystal layer 300, respectively. Further, as shown in FIG. 7 and FIG. 8, the first electrode layer 120 includes a plurality of first electrode strips 121 disposed to be insulated from each other, and the second electrode layer 220 includes a plurality of second electrode strips 224 to be insulated from each other. An extending direction of the first electrode strips 121 is perpendicular to an extending direction of the second electrode strips 224. FIG. 9 is a structural representation of a display apparatus including the liquid crystal light modulator shown in FIG. 8. As shown in FIG. 9, along the stacking direction from the second baseplate to the first baseplate, the display devices 11 correspond to overlapping regions 131 of the first electrode strips 121 and the second electrode strips 224, respectively.

It should be noted that when a certain bias voltage is applied to the first electrode strips 121 and the second electrode strips 224, the liquid crystal molecules in the overlapping regions 131 can rotate at a corresponding angle, so that the phase delays of light emitted from the display device 11 corresponding to the overlapping regions 131 can be achieved, thus achieving the independent modulation of the light emitted by each of the display device 11.

It should also be noted that in other implementations of the present embodiment, the number of overlapping regions 131 of the first electrode strips 121 and the second electrode strips 224 may also be greater than the number of the display devices 11.

In an embodiment, both the number of the first electrode strips 121 and the number of the second electrode strips 224 may be greater than or equal to 10. It should be noted that the larger the number of the first electrode strips 121 and the number of the second electrode strips 224 is, the smaller the area of the overlapping regions 131 of the first electrode strips 121 and the second electrode strips 224 will be, and the higher the modulation precision of the liquid crystal light modulator will be. In order to obtain a high precision of the liquid crystal light modulator, in this embodiment, it may set the number of the first electrode strips 121 and the second electrode strips 224 to be greater than or equal to 10.

Continuing to refer to FIG. 8 and FIG. 9, the display devices 11 are arranged in a matrix, and the stacking direction from the second baseplate to the first baseplate is defined as a first direction, and the cross section of the first electrode strips 121 and the cross section of the second electrode strips 224 perpendicular to the first direction are both rectangular. The regular arrangement of the display devices 11 enables the overlapping regions 131 of the first electrode strips 121 and the second electrode strips 224 to be arranged in a regular manner, thereby enabling the cross section of the first electrode strips 121 and the second electrode strips 224 perpendicular to the first direction to be easy to design and make, and simplifying the formation process of the first electrode strips 121 and the second electrode strips 224.

Figure 10:
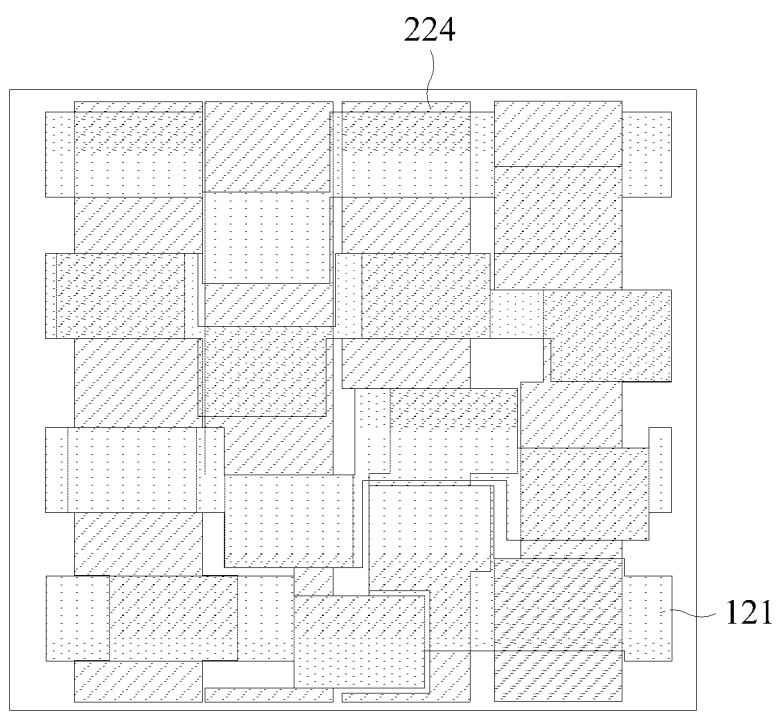
FIG. 10 is a structural representation of still another liquid crystal light modulator according to an embodiment of the present invention.
Figure 11:
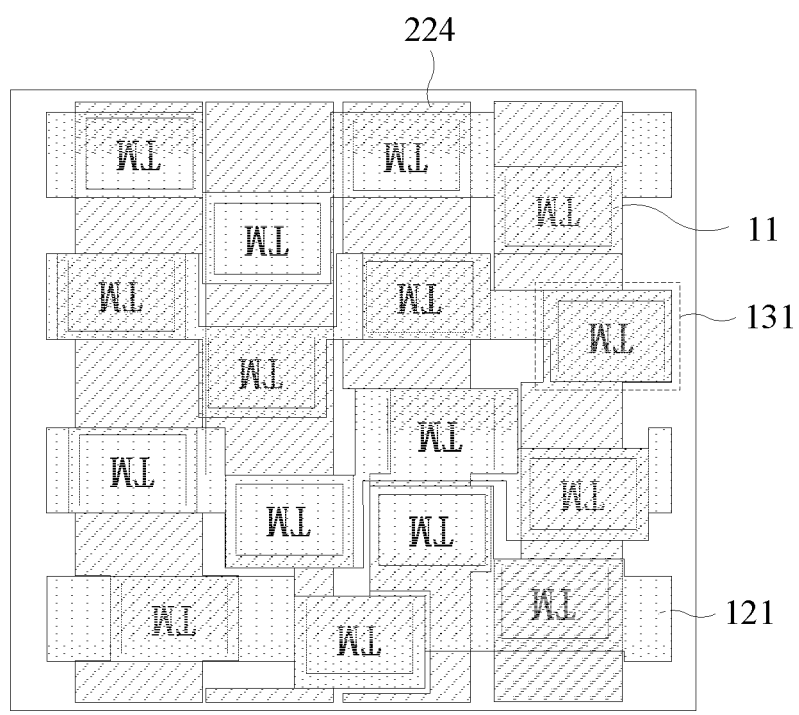
FIG. 11 is a structural representation of a display apparatus including the liquid crystal light modulator shown in FIG. 10.

FIG. 10 is a structural representation of still another liquid crystal light modulator according to an embodiment of the present invention. FIG. 11 is a structural representation of a display apparatus including the liquid crystal light modulator shown in FIG. 10. The structure of the display apparatus shown in FIG. 11 is similar to the structure of the display apparatus shown in FIG. 9, except that the display devices 11 shown in FIG. 11 are arranged in an irregular manner, and the stacking direction from the second baseplate to the first baseplate is defined as a first direction, and two parallel long edges of cross sections of the first electrode strips 121 and the second electrode strips 224 perpendicular to the first direction are serrated.

It should be noted that, as shown in FIG. 11, in order to make the light emitted from each of the display devices 11 to be effectively modulated, the display devices 11 may need to be disposed to correspond to the overlapping regions 131 of the first electrode strips 121 and the second electrode strips 224. Due to the irregular arrangement of the display devices 11, in order to achieve the above correspondence, the shapes of the first electrode strips 121 and the second electrode strips 224 in this embodiment may need to be designed according to the position of the display device 11, so that the two parallel long edges of the first electrode strips and the second electrode strips perpendicular to the first direction are both serrated. Referring to FIG. 11, each of the protrusions in the above serrations correspond to at least one of the display devices 11.

In this embodiment, the amount of change in a phase of red light of the incident light by the liquid crystal light modulator is greater than or equal to $2\pi$. It should be noted that the phase of the light is in a period of $2\pi$. Therefore, for a light beam, when the amount of change in the phase of the light beam is arbitrarily selected between 0 and $2\pi$, a unique corresponding wavefront would be obtained. When the amount of change in the phase of the light beam is increased beyond $2\pi$, for example, when the amount of change in the phase of light beam is $3\pi$, the obtained wavefront will be the same as that obtained when the amount of change in the phase of the light beam is $\gamma E$ ($3\pi-2\pi$), due to the periodicity of the phase of the light beam. For a normal lens, when the same light beam passes through the lens with a certain focal length a unique corresponding wavefront will be obtained. If the focal length of the lens is changed, the corresponding wavefront will be changed, that is, each focal length of the lens corresponds to a unique wavefront. Therefore, if the liquid crystal light modulator in this embodiment is regarded as a lens, when the amount of change in the phase of the light by the liquid crystal light modulator is $2\pi$, the focal length of the lens may have the maximized variable range, and the object has a maximized range of images obtained after passing through the lens, so that the height of the obtained suspension image in this embodiment can be varied in a maximum range. In addition, red, green and blue are regarded as three primary colors of the light. To realize color rendering, the light emitted from the display apparatus includes red light, green light and blue light, where the red light has a longest wavelength. Therefore, when the amount of change in the phase of the red light in incident light by the liquid crystal light modulator is greater than or equal to $2\pi$, the amount of change in the phases of the green light and blue light will be greater than $2\pi$. To maximize the variable range of the height of the suspension image displayed by the entire display apparatus, the amount of change in the phase of the red light in the incident light by the liquid crystal light modulator is set to be greater than or equal to $2\pi$.

It is considered that $\Delta\Phi = \Delta n (2\pi/\lambda)d$, where $\Delta\Phi$ is the amount of change in the phase of the incident light, $\Delta n$ is the amount of change in the refractive index of the liquid crystal molecule after being rotated by a device of angle relative to an initial state thereof (for a fixed liquid crystal, $\Delta n$ is unchanged), $\lambda$ is the wavelength of the incident light, and d is the cell thickness of the liquid crystal light modulator. From above, it can be known that d is decreased with the decrease of $\Delta\Phi$. When the value of $\Delta\Phi$ is minimum, the minimum value of d can be obtained. Also, based on the foregoing analysis, the amount of change in the phase of the red light in the incident light by the liquid crystal light modulator is at least $2\pi$, and the amount of change in the phases of the green light and blue light is greater than $2\pi$. Therefore, in this embodiment, the amount of change in the phase of the incident light by the liquid crystal light modulator is at least $2\pi$, and the corresponding light is red light. In this case, $\Delta\Phi = 2\pi$, $\lambda$ is the wavelength of the red light and $\Delta n = 0.2$ (corresponding to the liquid crystal light modulator in this embodiment). Based on above formula, the minimum thickness of the liquid crystal light modulator is about 3.164 μm.

Figure 12:
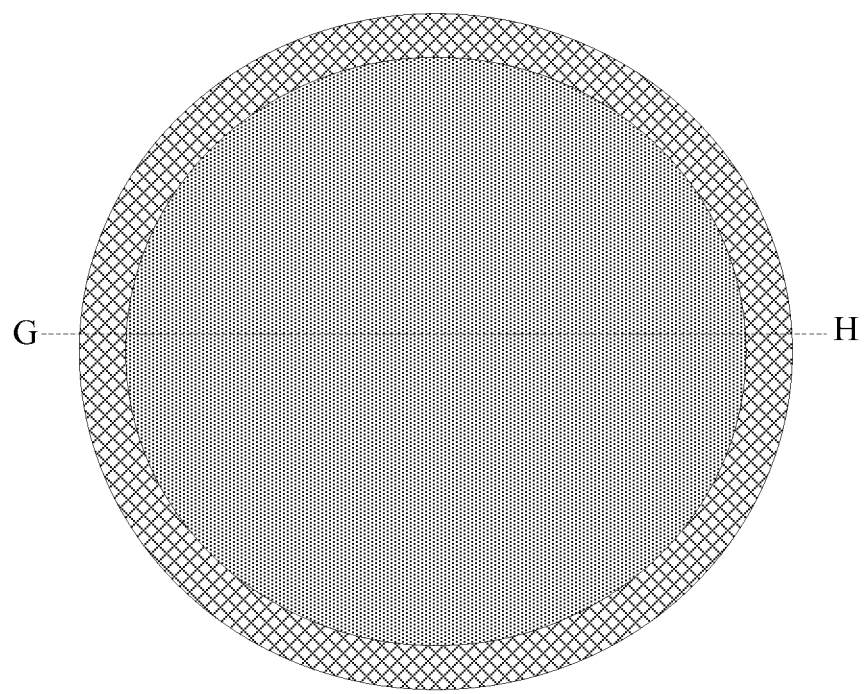
FIG. 12 is a structural representation of an electrowetting zoom lens according to an embodiment of the present invention.
Figure 13:
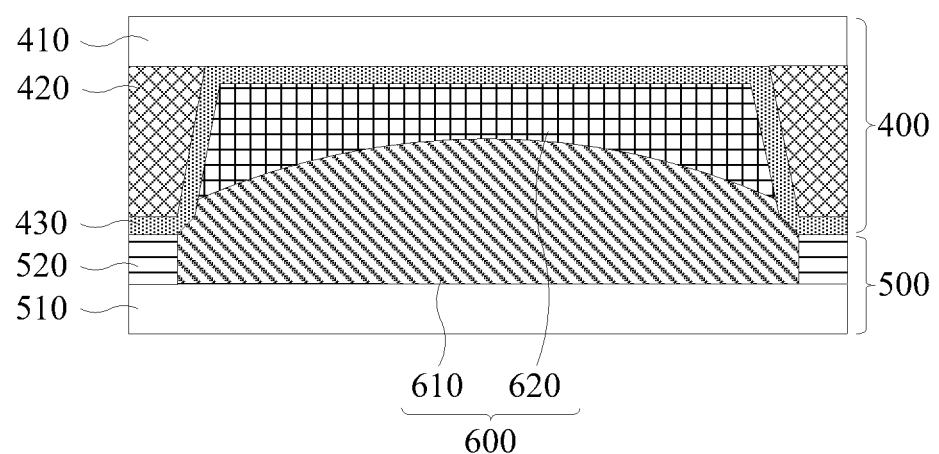
FIG. 13 is a schematic sectional view taken along a dashed line GH in FIG. 12.

FIG. 12 is a structural representation of an electrowetting zoom lens according to an embodiment of the present invention. FIG. 13 is a schematic sectional view taken along a dashed line GH in FIG. 12. As shown in FIG. 13, the electrowetting zoom lens includes a first electrode baseplate 400 and a second electrode baseplate 500 disposed opposite to each other, and a liquid layer 600. The first electrode baseplate 400 includes a first cover plate 410, a first ring electrode 420 located on a side of the first cover plate 410 close to the liquid layer 600, and an insulating layer 430 located on a side of the first ring electrode 420 and the first cover plate 410 close to the liquid layer 600. The first ring electrode 420 extends along an edge of the first cover plate 410. The second electrode baseplate 500 includes a second cover plate 510, a second ring electrode 520 located on a side of the second cover plate 510 close to the liquid layer 600, and the second ring electrode 520 extends along an edge of the second cover plate. Continuing to refer to FIG. 13, the liquid layer 600 is disposed within an accommodating space formed by the first electrode baseplate 400 and the second electrode baseplate 500 and includes an electrolyte layer 620 and an insulating liquid layer 610. The electrolyte layer 620 is located on a side of the insulating liquid layer 610 close to the first electrode baseplate 400.

Figure 14:
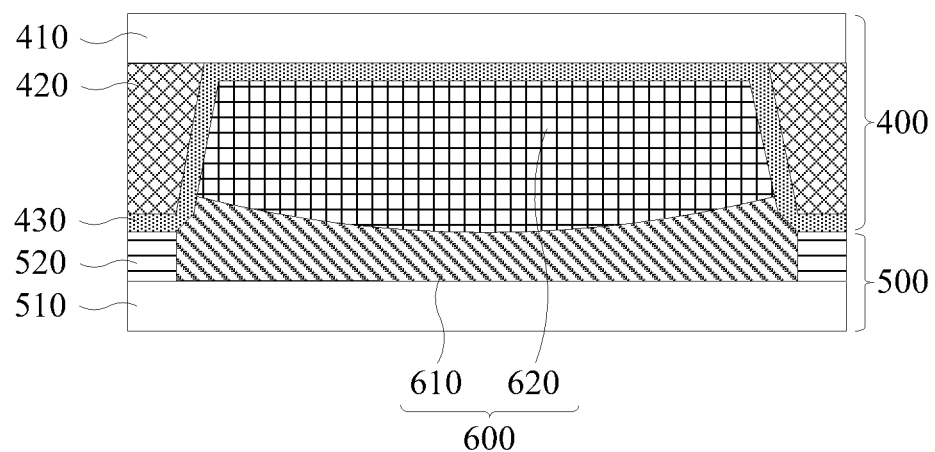
FIG. 14 is another schematic sectional view taken along the dashed line GH in FIG. 12.

It should be noted that FIG. 13 is a structural representation of the structure of the electrowetting zoom lens in the case that no voltage is applied to the first ring electrode 420 and the second ring electrode 520. In this arrangement, due to the difference (the difference in surface free energy essentially) in wetting characteristics on a solid surface, a contact interface of the electrolyte layer 620 and the insulating liquid layer 610 presents a certain angle, and hence a concave lens is formed equivalently. FIG. 14 is another schematic sectional view taken along the dashed line GH in FIG. 12. FIG. 14 is a structural representation of the electrowetting zoom lens after a voltage is applied to the first ring electrode 420 and the second ring electrode 520. As shown in FIG. 14, when a voltage is applied to the first ring electrode 420 and the second ring electrode 520, induced charges are present on the surface of the electrolyte layer 620 and thus difference in the wetting characteristics of the electrolyte layer 620 on the solid surface is changed, so that the angle of the contact interface between the electrolyte layer 620 and the insulating liquid layer 610 is changed, thereby changing the effect of the entire electrowetting zoom lens from a concave lens to a convex lens. It should be noted that the angle of the contact the interface between the electrolyte layer 620 and the insulating liquid layer 610 can be adjusted by changing the magnitude of the voltage applied to the first ring electrode 420 and the second ring electrode 520, so as to adjust the focal length of the electrowetting lens. When the new suspension image is regarded as the secondary imaging of the original suspension image as an object via the electrowetting zoom lens, the multi-layer display of the suspension image can be realized, and when the focal length of the lens is changed frequently, the three-dimensional dynamic display on visual effects can be realized.

Figure 15:
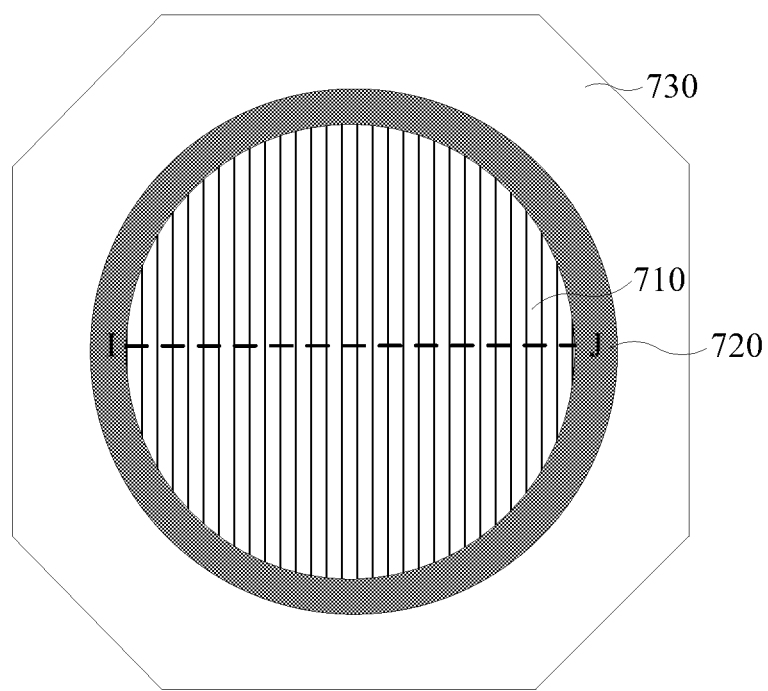
FIG. 15 is a structural representation of a piezoelectric zoom lens according to an embodiment of the present invention.

FIG. 15 is a structural representation of a piezoelectric zoom lens according to an embodiment of the present invention. As shown in FIG. 15, the piezoelectric zoom lens includes a central liquid lens 710, an ring-shaped piezoelectric vibrator 720 disposed surrounding the central liquid lens 710, and an insulating rigid frame 730 disposed surrounding the ring-shaped piezoelectric vibrator 720.

It should be noted that, the center liquid lens 710 is made of a transparent solid thin wall filled with liquid having a high transmittance. The ring-shaped piezoelectric vibrator 720 has a ring shape, and an inner diameter thereof is a radius of the center liquid lens 710 and a radial inner and outer surfaces thereof have electrodes. A potential difference between the radial inner and outer surfaces can adjust size of expansion and contraction of the ring-shaped piezoelectric vibrator 720, thereby changing the inner diameter of the ring-shaped piezoelectric vibrator 720, and the radius of the center liquid lens 710 is also changed accordingly. The outermost insulating rigid frame 730 is used to limit outer deformation of the piezoelectric vibrator.

Figure 16:
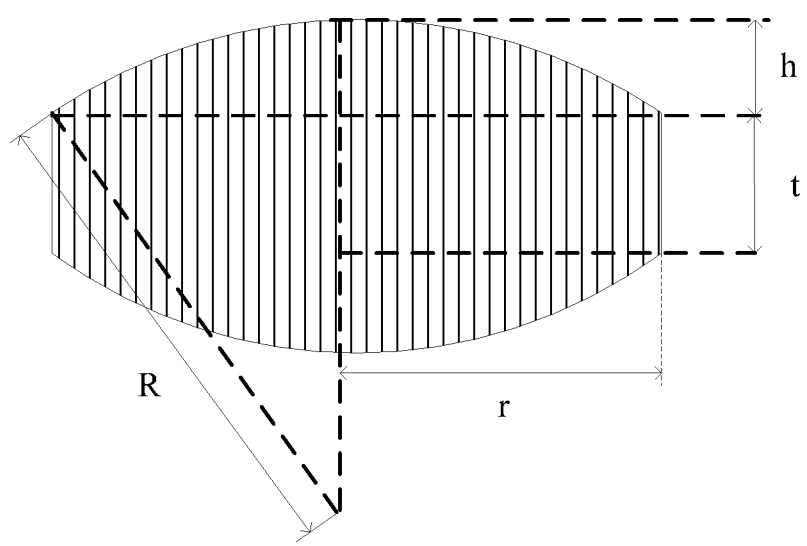
FIG. 16 is a schematic sectional view taken along a dashed line IJ in FIG. 15.

It should also be noted that since the liquid is incompressible, its volume is always $V=2\pi h2(R-h/3)+\pi r2t$. FIG. 16 is a schematic sectional view taken along a dashed line IJ in FIG. 15, and h, R, r and t in the above formula are shown in FIG. 16. According to FIG. 16, the radius r of the central liquid lens 710 can be affected by the piezoelectric vibrator, and the corresponding R and h are also changed accordingly, thereby changing the focal length of the piezoelectric zoom lens. Also, when the new suspension image is regarded as the secondary imaging of the original suspension image as an object via the piezoelectric zoom lens, the multi-layer display of the suspension image can be realized, and when the focal length of the lens is changed frequently, the three-dimensional dynamic display on visual effects can be realized.

What is claimed is:

1. A display apparatus, comprising:
a display panel, comprising a plurality of display devices;
a micro lens group located above a light-emitting side of the display panel, wherein the micro lens group comprises a plurality of micro lens devices, and the micro lens devices are disposed to correspond to the plurality of display devices, respectively, wherein a distance between a center of the micro lens device closer to a center of the display panel and a center of the corresponding display device is less than a distance between a center of the micro lens device farther from the center of the display panel and a center of the corresponding display device;
and
a liquid lens disposed on a side of the micro lens group away from the display panel, wherein the liquid lens is configured for performing multi-layer display for a suspension image by changing a phase of incident light.

2. The display apparatus according to claim 1, wherein a refresh frequency of a driving signal for the plurality of display devices is the same as a refresh frequency of a driving voltage for the liquid lens.

3. The display apparatus according to claim 1, wherein the refresh frequency of a driving voltage for the liquid lens is greater than or equal to 60 Hz.

4. The display apparatus according to claim 1, wherein the liquid lens is in contact with the micro lens group.

5. The display apparatus according to claim 1, wherein the liquid lens is at least one of a liquid crystal light modulator, an electrowetting zoom lens and a piezoelectric zoom lens.

6. The display apparatus according to claim 5, wherein the liquid crystal light modulator comprises a first baseplate and a second baseplate disposed opposite to each other, and a liquid crystal layer disposed between the first baseplate and the second baseplate;
wherein the first baseplate comprises a first substrate, a first electrode layer and a first alignment layer which are sequentially stacked, and the second baseplate comprises a second substrate, a second electrode layer and a second alignment layer which are sequentially stacked, wherein the first alignment layer and the second alignment layer are located at two sides of the liquid crystal layer, respectively.

7. The display apparatus according to claim 6, wherein the first electrode layer is formed as a whole layer structure, and the second electrode layer comprises a circular electrode and a plurality of ring electrodes;
wherein if a stacking direction from the second baseplate to the first baseplate is defined as a first direction, a circle center of a cross section of the circular electrode perpendicular to the first direction is O, and a geometric center of a cross section of each of the plurality of ring electrodes perpendicular to the first direction is Kn, then O coincides with Kn; and
along an extending direction of a diameter of the circular electrode, the plurality of ring electrodes are successively disposed outside the circular electrode; and adjacent electrodes in the second electrode layer are insulated from each other.

8. The display apparatus according to claim 7, wherein the second electrode layer further comprises at least one connection electrode, wherein the connection electrode comprises a plurality of sub-connection electrodes, and adjacent two of the plurality of sub-connection electrodes are electrically connected to each other via a conductive wire; the plurality of sub-connection electrodes are all located on one ring, and a geometric center of the ring coincides with the circle center O of the cross section of the circular electrode perpendicular to the first direction;
the at least one connection electrode comprises a plurality of connection electrodes; and
along the extending direction of the diameter of the circular electrode, the plurality of connection electrodes are successively disposed outside the plurality of ring electrodes.

9. The display apparatus of claim 7, wherein the number of the ring electrodes is greater than or equal to 9.

10. The display apparatus according to claim 6, wherein the first electrode layer comprises a plurality of first electrode strips disposed to be insulated from each other, and the second electrode layer comprises a plurality of second electrode strips to be insulated from each other, wherein an extending direction of the first electrode strips is perpendicular to an extending direction of the second electrode strips; and
along the stacking direction from the second baseplate to the first baseplate, the display devices correspond to overlapping regions of the first electrode strips and the second electrode strips, respectively.

11. The display apparatus according to claim 10, wherein the number of the first electrode strips and the number of the second electrode strips are both greater than or equal to 10.

12. The display apparatus according to claim 10, wherein the display devices are arranged in a matrix; and the stacking direction from the second baseplate to first baseplate is defined as a first direction, and cross sections of the first electrode strips and cross sections of the second electrode strips perpendicular to the first direction are both rectangular.

13. The display apparatus according to claim 10, wherein the display devices are arranged in an irregular manner; and the stacking direction from the second baseplate to the first baseplate is defined as a first direction; and two parallel long edges of cross sections of the first electrode strips and the second electrode strips perpendicular to the first direction are serrated.

14. The display apparatus according to claim 5, wherein the liquid crystal light modulator changes a phase of red light in incident light by greater than or equal to $2\pi$.

15. The display apparatus according to claim 5, wherein the electrowetting zoom lens comprises a first electrode baseplate and a second electrode baseplate disposed opposite to each other, and a liquid layer;

wherein the first electrode baseplate comprises a first cover plate, a first ring electrode located on a side of the first cover plate close to the liquid layer, and an insulating layer located on a side of the first ring electrode and the first cover plate close to the liquid layer, wherein the first ring electrode extends along an edge of the first cover plate;

the second electrode baseplate comprises a second cover plate, a second ring electrode located on a side of the second cover plate close to the liquid layer, wherein the second ring electrode extends along an edge of the second cover plate; and the liquid layer is disposed within an accommodating space formed by the first electrode baseplate and the second electrode baseplate and comprises an electrolyte layer and an insulating liquid layer, wherein the electrolyte layer is located on a side of the insulating liquid layer close to the first electrode baseplate.

16. The display apparatus according to claim 5, wherein the piezoelectric zoom lens comprises a liquid lens, an ring-shaped piezoelectric vibrator surrounding the liquid lens, and an insulation rigid frame surrounding the ring-shaped piezoelectric vibrator.

17. The display apparatus according to claim 1, wherein the display panel is any one of a liquid crystal display panel, a cathode ray tube display panel and an organic light-emitting display panel.

* * * * *